United States Patent [19]

Brand et al.

[11] Patent Number: 4,543,816
[45] Date of Patent: Oct. 1, 1985

[54] METHOD AND APPARATUS FOR MONITORING THE DIAMETERS OF ROD-SHAPED PRODUCTS OF THE TOBACCO PROCESSING INDUSTRY

[75] Inventors: Peter Brand, Hamburg; Heinz-Christen Lorenzen, Wentorf; Uwe Heitmann; Peter Menzel, both of Hamburg, all of Fed. Rep. of Germany

[73] Assignee: Hauni-Werke Korber & Co. K.G., Hamburg, Fed. Rep. of Germany

[21] Appl. No.: 603,458

[22] Filed: Apr. 24, 1984

[30] Foreign Application Priority Data

Apr. 30, 1983 [DE] Fed. Rep. of Germany ....... 3315866
Sep. 3, 1983 [DE] Fed. Rep. of Germany ....... 3331902

[51] Int. Cl.⁴ .............................................. G01B 13/08
[52] U.S. Cl. ...................................... 73/37.6; 73/37.8
[58] Field of Search ................. 73/37.7, 37.6, 37.5, 73/38, 37.8

[56] References Cited

U.S. PATENT DOCUMENTS

| | | | |
|---|---|---|---|
| 3,585,844 | 6/1971 | Dornseiffen | 73/37.7 |
| 3,595,067 | 7/1971 | Von Der Lohe et al. | 73/37.6 |
| 3,633,590 | 1/1972 | Pocock et al. | 73/37.7 X |
| 3,668,928 | 6/1972 | Strydom | 73/37.5 X |
| 4,121,450 | 10/1978 | Zurcher | 73/37.6 X |
| 4,181,007 | 1/1980 | Arisaka et al. | 73/37.8 |

FOREIGN PATENT DOCUMENTS

1903615 9/1969 Fed. Rep. of Germany ....... 73/37.7
52-5591 1/1977 Japan ................................... 73/37.7

Primary Examiner—Jerry W. Myracle
Assistant Examiner—Joseph W. Roskos
Attorney, Agent, or Firm—Peter K. Kontler

[57] ABSTRACT

The diameter of a continuous filter rod is monitored in a tubular nozzle through which successive increments of the rod are conveyed axially and which directs against the external surface of the tubular envelope of the rod a narrow annular stream of compressed air at a pressure which does not result in deformation of the envelope. The thus admitted air is permitted to escape into the atmosphere only by way of two narrow passages which flank the region of contact between the air stream and the envelope. A flow meter indirectly monitors the rate of flow of air through such passages and generates signals which are indicative of the diameters of successive increments of the envelope. The pressure of the air stream which impinges upon the envelope is constant. The permeability of the material of the envelope can be ascertained by a discrete testing unit, and the results of such test are processed with the results of monitoring of the diameter by a computer which transmits signals serving to adjust the machine, to actuate an alarm or to arrest the machine.

28 Claims, 4 Drawing Figures

METHOD AND APPARATUS FOR MONITORING THE DIAMETERS OF ROD-SHAPED PRODUCTS OF THE TOBACCO PROCESSING INDUSTRY

BACKGROUND OF THE INVENTION

The present invention relates to improvements in methods and apparatus for monitoring the diameters of rod-shaped products, especially rod-shaped products of the tobacco processing industry. Such products include continuous cigarette rods, sections of cigarette rods (i.e., plain cigarettes of unit length or multiple unit length), continuous filter rods, sections of filter rods (i.e., filter mouthpieces or plugs of unit length or multiple unit length), continuous cigarillo or cigar rods, sections of cigarillo or cigar rods, filter cigarettes, cigarillos or cigars and analogous commodities which constitute or form part of smokers' products. More particularly, the invention relates to improvements in methods and apparatus for monitoring the diameters of rod-shaped products which comprise or can embody tubular wrappers of porous material, such as cigarette paper, artificial cork and the like. Still more particularly, the invention relates to improvements in methods and apparatus which can be resorted to with advantage in connection with the monitoring of diameters of continuous rod-shaped products, such as cigarette rods or filter rods which advance axially in or beyond a cigarette or filter rod making machine on their way to a station where they are subdivided into rod-shaped sections of desired (unit or multiple unit) length. For the sake of simplicity, the following description will deal primarily with the making and monitoring of filter rods. However, the improved method and apparatus can be used with equal or similar advantage for the monitoring of diameters of cigarette rods as well as all other aforeenumerated rod-shaped products.

It is customary to monitor the diameter of a filter rod which is produced in a filter rod making machine wherein a web of cigarette paper or the like is draped around a continuous rod-like filler of fibrous or other filter material. The reason is that deviations of the diameter of a filter rod from a standard value can result in the making of long series of defective products. Thus, when a filter rod is subdivided into filter rod sections of desired length and such sections are assembled with plain cigarettes into filter cigarettes of unit length or multiple unit length, the diameter of the filter rod section must be the same as that of the plain cigarette. Otherwise, the customary uniting bands which are used to assemble filter rod sections with plain cigarettes will exhibit leaks and the resulting filter cigarettes will be ejected by the testing unit which inspects finished filter cigarettes in a filter tipping machine for the integrity of their wrappers. Moreover, differences between the diameters of filter rod sections and plain cigarettes in filter cigarettes detract from the appearance of filter cigarettes and interfere with proper introduction of such products into soft packs, hard packs or other types of receptacles. The unit which tests the wrappers of filter cigarettes for integrity must ascertain small and also minute deviations of permeability from optimum permeability, especially in view of the recently introduced ventilating zones which constitute intentionally formed perforations in order to allow for penetration of controlled quantities of fresh air into the column of tobacco smoke when the cigarette is lighted and the smoker draws smoke into his or her mouth.

Heretofore known diameter monitoring apparatus employ special types of nozzles wherein successive increments of the rod are acted upon by a gaseous testing fluid and which operate quite satisfactorily as long as the material of the wrapper or envelope is at least substantially impermeable to air. Reference may be had to commonly owned British Pat. No. 1.521,116 which discloses a nozzle for the monitoring of the diameter of a continuous filter rod and operates quite satisfactorily as long as the tubular envelope of the filter rod does not permit testing fluid to penetrate therethrough. However, such diameter monitoring apparatus become unreliable if the wrapper of the tested rod-shaped product is permeable to air which is invariably or practically invariably the case in modern filter rod making machines which assemble the filter rod from a rod-like filler of filter material and a tubular envelope which is made of porous or even highly porous wrapping material. At the very least, conventional diameter monitoring units are incapable of ascertaining relatively small deviations of the diameter of a continuous filter rod from an optimum value if the envelope of such filter rod consists of porous or highly porous material. Failure to immediately detect deviations of the diameter from an optimum value can result in the making of a long series of defective filter rod sections and of an equally long series of unsatisfactory filter cigarettes because a modern filter rod maker can turn out many thousands of filter rod sections per unit of time.

OBJECTS AND SUMMARY OF THE INVENTION

An object of the invention is to provide a novel and improved method of monitoring the diameter of a continuous rod-like product or the diameters of a succession of rod-like products of finite length in such a way that the results of measurements are not distorted because the product happens to comprise a porous envelope and/or because the porosity of the material of the envelope fluctuates.

Another object of the invention is to provide a method which renders it possible to fully consider the permeability of the envelope in determining the diameter of the rod-shaped product so that the results of the measurement are truly indicative of the diameters of successive increments of the moving product.

A further object of the invention is to provide a method which can be practiced for the testing of a wide variety of rod-shaped products with a heretofore unmatched degree of reliability.

An additional object of the invention is to provide a method which can be used for the monitoring of diameters of rod-shaped products whose envelopes may or may not be permeable to air or to another gaseous fluid.

A further object of the invention is to provide a novel and improved apparatus for the practice of the above outlined method.

Another object of the invention is to provide the apparatus with novel and improved means for directing the flow of a gaseous testing fluid toward impingement upon and away from successive increments of a moving rod-shaped product, such as a continuous filter rod.

An additional object of the invention is to provide an apparatus which can monitor the diameters of successive increments of a continuous or discontinuous rod-shaped product as well as the porosity of successive increments of wrapping material of which the envelope of the rod-shaped product consists.

A further object of the invention is to provide the apparatus with novel and improved means for evaluating the results of the monitoring of diameters of successive increments of the rod and of the porosity of successive increments of wrapping material for the envelope of the rod.

Another object of the invention is to provide an apparatus which is designed to produce signals of the type capable of being used, in a simple and efficient way, for regulation of the machine which produces or assembles the rod-shaped product.

A further object of the invention is to provide a novel and improved nozzle-like diameter testing element for use in the above outlined apparatus.

Another object of the invention is to provide a rod-making machine which embodies the above outlined apparatus.

One feature of the invention resides in the provision of a method of monitoring the diameter of a rod-shaped product of the tobacco processing industry, particularly a filter rod having a substantially rodlike filler of filter material which is surrounded by a tubular envelope or wrapper consisting of a porous wrapping material. The method comprises the steps of transporting the product axially along a predetermined path, e.g., through the axially extending bore of a stationary testing nozzle, establishing between the exterior of the product in a portion of the path and the atmosphere at least one circular passage of a predetermined cross-sectional area so that the unoccupied portion of such passage varies with deviations of the diameter of the product portion that passes therethrough from a predetermined value (namely, from an optimum or standard diameter), directing against the exterior of the moving product a stream of gaseous testing fluid (e.g., air) so that the fluid impinges upon the product, confining such fluid (preferably by a portion of the aforementioned nozzle) to the flow into the atmosphere at least substantially exclusively by way of the unoccupied portion of the passage (with the exception of that fluid which penetrates through the porous envelope and into the filler of the product if the latter is a filter rod or the like having a tubular envelope of porous wrapping material), maintaining the pressure of the impinging fluid at an at least substantially constant value (e.g., 10 mbar), and generating first signals which denote fluctuations of the rate of fluid flow through the passage as a function of deviations of the diameter of the product from the predetermined value. If the product is deformable by the impinging gaseous fluid when the pressure of such fluid exceeds a given value, the aforementioned constant value of the pressure of testing fluid is selected in such a way that it at most matches but is normally below the given value so that the impinging fluid does not effect any deformation of the product in the path.

It is preferred to direct an annular stream of testing fluid against a circumferentially complete narrow annular portion of the exterior of the product in the path (e.g., the width of such annular portion, as considered in the axial direction, need not exceed 5 mm and can be in the range of 1 mm).

As a rule, the pressure of impinging testing fluid exceeds atmospheric pressure, and the method then preferably further comprises the step of effecting an abrupt drop of pressure of testing fluid immediately downstream of the passage, i.e., even before the testing fluid leaves the nozzle to enter the surrounding atmosphere. The passage can be defined by an annular knife edge of the nozzle so that the width of such passage (as considered in the axial direction of the product) is negligible, and such passage is preferably immediately adjacent to a plenum chamber wherein the inflowing testing fluid is caused to form a circumferentially complete annular stream which impinges upon the exterior of the product immediately prior to entering the unoccupied portion of the passage. Abrupt expansion is preferably selected in such a way that the pressure of testing fluid is reduced to atmospheric pressure.

The method can further comprise the steps of converting the wrapping material into the tubular envelope of the rod-shaped product ahead of the aforementioned portion of the path for the product, ascertaining the porosity of wrapping material prior to the converting step, generating second signals which are indicative of the ascertained porosity, and relating the second signals to the respective first signals so as to "cleanse" the first signals of the influence of porosity of the wrapping material. The ascertaining step can include directing against the wrapping material a pneumatic testing fluid so that such pneumatic fluid penetrates through the wrapping material at a rate which is a function of porosity of the wrapping material, and the step of generating second signals then includes generating (second) signals whose characteristics fluctuate as a function of fluctuations of the rate of flow of pneumatic testing fluid through the wrapping material. Such method preferably further comprises the step of maintaining the pressure of pneumatic fluid at an at least substantially constant value. The relating step can comprise modifying the second signals in accordance with the equation $Y = f(Q_2)$ wherein $Q_2$ is the second signal, and thereupon computing the diameter of the product in accordance with the equation $$d = (Q_{10} - Q_1)/Y(Q_2)$$

wherein d is the diameter of the product, $Q_{10}$ is the rate of fluid flow through the passage when the diameter of the product equals zero, $Q_1$ is the rate of fluid flow through the passage when the diameter of the product exceeds zero but does not exceed the diameter of the passage or passages, and $Y(Q_2)$ denotes (either directly or indirectly) the porosity of the selected wrapping material.

The second signals are preferably delayed prior to the relating step, preferably in such a way that the delay does not influence the amplitude of the delayed signal.

The method preferably further comprises the steps of comparing the second signals with a reference signal denoting a maximum or a minimum acceptable permeability or porosity of the wrapping material, and generating a third signal (e.g., to actuate an alarm or to arrest the machine which turns out the product) whenever the porosity which is denoted by the second signal is below the minimum acceptable porosity or exceeds the maximum acceptable porosity.

Another feature of the invention resides in the provision of an apparatus for monitoring the diameter of a rod-shaped product of the tobacco processing industry, particularly a filter rod having a porous tubular wrapper. The apparatus comprises a conveyor or other suitable means for transporting the product axially along a predetermined path, means (such as a tubular nozzle) for establishing between the exterior of the product in a predetermined portion of the path and the atmosphere at least one passage of predetermined cross-sectional area so that the unoccupied portion of such passage varies with deviations of the diameter of the product portion in the passage from a predetermined (optimum) value, an air compressor or another suitable source of compressed gaseous testing fluid, means for conveying from the source a stream of testing fluid against the exterior of the product so that the fluid impinges upon the product, including means (such as a portion of the aforementioned nozzle) for confining the fluid to the flow into the atmosphere by way of the unoccupied portion of the passage, means for maintaining the pressure of conveyed fluid at an at least substantially constant value, and means (e.g., a flow meter) for generating first signals (e.g., voltage signals) denoting fluctuations of the rate of flow of testing fluid through the passage as a function of deviations of the diameter of the product from the predetermined value. The confining means can comprise an annular plenum chamber which surrounds a second portion of the path for the product adjacent to the first portion of such path. If the product is deformable by the impinging testing fluid when the pressure of such fluid exceeds a given value, the aforementioned maintaining means preferably includes means (such as a testing unit including a regulating valve in the means for conveying testing fluid from the source against the exterior of the product) for holding the pressure of testing fluid at but preferably below such given value.

The means for establishing one or more passages can include an annular member (e.g., a portion of the aforementioned nozzle) having a circumferentially complete knife edge which surrounds the passage.

The plenum chamber is preferably immediately adjacent to the passage or passages and is disposed upstream of the passage or passages, as considered in the direction of flow of testing fluid from the plenum chamber, through the passage or passages (the passages flank the plenum chamber if the nozzle is provided with two passages) and into the surrounding atmosphere. The nozzle is preferably provided with an expansion chamber for each passage, and each expansion chamber is disposed immediately downstream of the respective passage and communicates with the latter so as to allow for an abrupt reduction (preferably down to atmospheric pressure) of the pressure of testing fluid which flows from the passage or passages toward the atmosphere. At least one port can be provided in the nozzle for each expansion chamber to connect the latter with the atmosphere. Still further, the nozzle can comprise guide means for the product, and such guide means then surrounds at least one additional portion of the aforementioned path for the product. The guide means defines one or more channels whose cross-sectional area is smaller than the cross-sectional area(s) of the passage(s) to thus ensure that any impurities which are carried by the exterior of the product deposit in such channel or channels rather than in the passage or passages.

The apparatus can further comprise means for ascertaining the porosity of the wrapping material of the envelope of the rod-shaped product, means for generating second signals which are indicative of the porosity of wrapping material, and means for relating the second signals to the first signals. The means for generating second signals can form part of the ascertaining means and can constitute or include a second flow meter. In accordance with a presently preferred embodiment of the invention, the ascertaining means comprises a source of pneumatic testing fluid (this source may be identical with the source of testing fluid for determination of the diameter of the product) and means for directing a stream of pneumatic fluid from the respective source against the wrapping material so that the rate of flow of pneumatic testing fluid through the wrapping material is indicative of the porosity of such material. The means for generating second signals then includes means for monitoring the rate of flow of pneumatic testing fluid through the wrapping material. Such apparatus preferably further comprises means for maintaining the pressure of pneumatic testing fluid which is directed against the wrapping material at an at least substantially constant value.

The aforementioned relating means can comprise computer means which is arranged to receive first and second signals from the respective signal generating means, and such relating means can further comprise a function generator which modifies the second signals in dependency on anticipated porosity of the wrapping material and transmits the thus modified second signals to the computer means.

Still further, the apparatus can comprise means (e.g., a threshold circuit) for comparing the second signals with a reference signal which denotes the minimum acceptable porosity of the wrapping material and for generating third signals when the porosity of wrapping material which is denoted by a second signal is less than the minimum acceptable porosity. A second threshold circuit can be provided to generate third signals when the porosity which is denoted by a second signal exceeds the maximum acceptable porosity. The third signals can be used to adjust or arrest the machine which turns out or treats the product and/or to alarm the attendants that the wrapping material for the envelope of the product is unsatisfactory.

Still further, the apparatus can comprise means (e.g., a shift register) for delaying the transmission of second signals to the relating means, such as to the aforementioned function generator. This is advisable when the wrapping material constitutes a running web and the ascertaining means includes means for ascertaining the porosity of successive increments of the running web. The delaying means is then designed to delay the transmission of second signals to the relating means for intervals of time which are required to ensure that the relating means receives a first signal simultaneously with a second signal denoting the porosity of that portion of the envelope which is then located in the predetermined portion of the path for the rod-shaped product. In other words, the delaying means ensures that the second signals advance to the relating means in imitation of advancement of the corresponding increments of the wrapping material to the passage or passages of the nozzle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
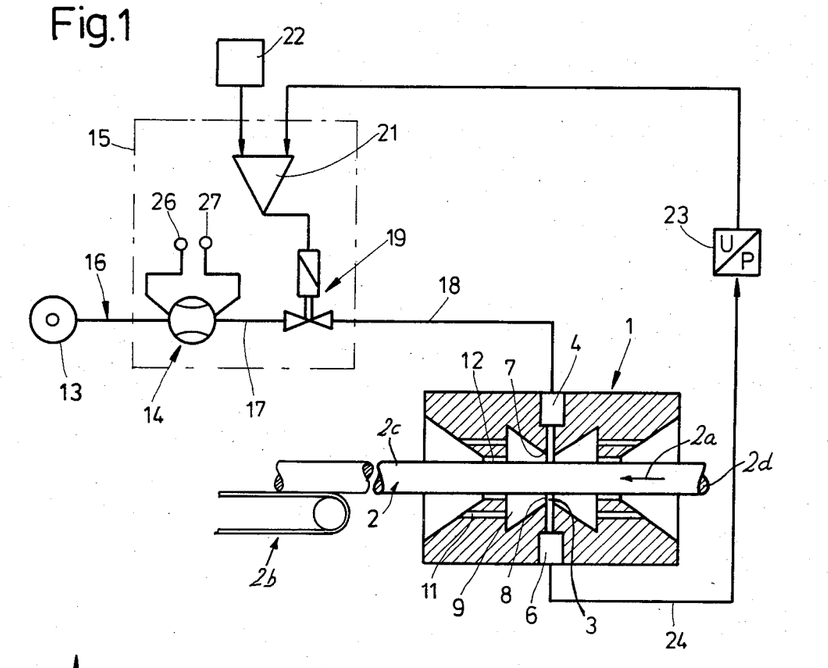
FIG. 1 is a schematic partly sectional view of an apparatus which embodies one form of the invention and is used to monitor the diameters of successive increments of a moving continuous filter rod.

The apparatus which is shown in FIG. 1 comprises a tubular nozzle 1 which surrounds a certain length of an elongated horizontal path wherein a continuous filter rod 2 is transported axially (arrow 2a) by a suitable conveyor 2b which is installed in a filter rod making machine. The machine may be of the type disclosed in British Pat. No. 1,521,116 or in the corresponding U.S. Letters Patent and serves to produce a continuous filter rod wherein a rod-like filler 2d (e.g., a filler consisting of artificial filaments which are partially bonded to each other by triacetin or another suitable plasticizer) is surrounded by an air-permeable (porous) tubular envelope or wrapper 2c constituting a converted web of cigarette paper or the like.

The nozzle 1 includes a centrally located annular portion which establishes a very narrow annular plenum chamber 3 traversed by successive increments of the moving rod 2. The testing apparatus of FIG. 1 further comprises a source 13 of compressed gaseous testing fluid (normally but not necessarily air) and means for conveying a stream of such testing fluid from the source 13 to the chamber 3. Such conveying means includes conduits 16, 17 and 18; the latter communicates with a radially extending bore 4 which is machined into the central portion of the nozzle 1 and connects the conduit 18 with the chamber 3. The chamber 3 further communicates with a second radially extending bore 6 in the central portion of the nozzle 1, and the bore 6 admits testing fluid to a conduit 24 which, in turn, admits such fluid to a conventional pressure to voltage transducer 23, e.g., a diaphragm transducer.

The chamber 3 is flanked by two nozzle portions which define annular knife edges 7 surrounding two circular testing passages 8, one at each side of the chamber 3. The unoccupied portion of the cross-sectional area of each passage 8 fluctuates or varies at the same rate as the diameter of the tubular envelope 2c of the rod 2, i.e., if the diameter of an increment of the envelope 2c which is disposed in either one of the testing passages 8 deviates from a predetermined standard value, the corresponding passage 8 will allow a larger or smaller quantity of testing fluid to flow from the chamber 3, through such passage and into the respective one of two annular expansion chambers 9 which are outwardly adjacent to the respective testing passages 8 and are also defined by the nozzle 1. The expansion chambers 9 communicate with the atmosphere by way of axially parallel ports 11 which are machined into the nozzle 1. The two end portions of the nozzle 1 constitute guide means which define coaxial ring-shaped channels 12 for the rod 2. The diameters of the surfaces bounding the channels 12 are smaller than the diameters of the knife edges 7 to thus ensure that any foreign matter (such as remnants of glue which is used to convert the aforementioned web of porous wrapping material into the tubular envelope 2c of the filter rod 2) will deposit on the surfaces surrounding the channels 12 rather than on the knife edges 7 because the deposition of any contaminants on such knife edges could immediately influence the accuracy of measurements, i.e., of the determination of deviations of the diameter of the rod 2 from an optimum value.

The source 13 can supply a stream of gaseous testing fluid at a pressure of between 2 and 5 bar, and such testing fluid is influenced by a testing unit 15 which includes means for maintaining the pressure of fluid in the conduit 18 (i.e., the pressure of fluid which enters the chamber 3 and impinges upon successive increments of the exterior of the moving rod 2) at a constant or nearly constant value which is above atmospheric pressure. For example, the testing unit 15 may be of the type known as FC 262 which is manufactured and sold by TYLAN, Carson. This unit comprises a signal generating flow meter 14 which is installed between the conduits 16, 17 and an adjustable solenoid-operated regulating valve 19 which ensures that the pressure of fluid entering the conduit 18 is constant or nearly constant. The inlet of the valve 19 receives testing fluid from the flow meter 14 and its outlet admits fluid into the conduit 18 for conveying into the plenum chamber 3 of the nozzle 1. The means for adjusting the valve 19 so that the latter maintains the testing fluid in the conduit 18 at an at least substantially constant value comprises an electric regulator 21 whose output is connected with the solenoid of the valve 19 and which has two inputs one of which is connected to a potentiometer 22 or another suitable source of electric reference signals. The other input of the regulator 21 is connected with the output of the transducer 23. The terminals 26, 27 of the flow meter 14 can be connected with a device which adjusts the filter rod making machine so as to influence the diameter of the rod 2 when such diameter deviates from the optimum value. The signals which are transmitted by the terminals 26, 27 are indicative of fluctuations of the rate of outflow of testing fluid by way of the passages 8 in response to deviations of the diameters of successive increments of the rod 2 from the desired or optimum value.

The mode of operation of the apparatus of FIG. 1 is as follows:

As a rule, the diameter of the tubular wrapper 2c of the moving filter rod 2 matches the desired or standard diameter so that the rate at which the passages 8 allow testing fluid to escape from the chamber 3 and into the surrounding atmosphere matches a predetermined value which is indicative of an acceptable filter rod, i.e., a rod whose diameter matches or closely approximates the desired value. Thus, the flow meter 14 detects such standard rate of admission of testing fluid into the chamber 3, and the intensity and/or another characteristic of the signal which is generated thereby is a function of the rate of escape of testing fluid into the atmosphere by way of the passages 8, expansion chambers 9, ports 11 and channels 12. The regulating valve 19 ensures that the pressure of testing fluid in the conduit 18 is constant; for example, such pressure can be in the range of approximately 10 mbar.

The stream of testing fluid which is admitted by the conduit 18 and bore 4 enters the plenum chamber 3 and impinges upon the exterior of the moving rod 2 substantially radially. Such stream forms in the chamber 3 a narrow or very narrow annulus because the axial length of this chamber is preferably small, e.g., not in excess of 5 mm. An advantage of a relatively narrow plenum chamber 3 (as considered in the axial direction of the filter rod 2) is that the results of measurements are not distorted by the material of the envelope 2c. Thus, the porosity of the material of the envelope 2c cannot unduly influence the monitoring of the diameter of the rod 2 even if such porosity is very pronounced so that, were the width of the chamber 3 increased, a substantial percentage of testing fluid could penetrate into the filler 2d of the rod 2 rather than flowing into the atmosphere exclusively by way of the testing passages 8. Moreover, the provision of a nozzle with a very narrow plenum chamber 3 ensures that even very pronounced fluctuations of the porosity of wrapping material for the envelope 2c cannot adversely influence (i.e., distort) the signals which indicate the diameters of successive increments of the envelope 2c.

Once the testing fluid has penetrated through the unoccupied portions of the passages 8 (i.e., through those portions of the passages 8 which are immediately adjacent to the respective knife edges 7, the fluid is allowed to abruptly expand in the chambers 9, preferably to such an extent that its pressure drops to atmospheric pressure. This is desirable and advantageous because any prolonging of the step of reducing the pressure of testing fluid which has penetrated through the passages 8 on its way into the atmosphere could distort the results of measurements. This will be readily appreciated by bearing in mind that the material of the envelope 2c is or can be at least slightly porous and, therefore, such material could permit penetration into the filler 2d of the rod 2 of substantial quantities of testing fluid which would be registered by the flow meter 14 as a reduction of the diameter of the corresponding portion of the envelope 2c so that the filter rod making machine would receive (from the terminals 26, 27) a signal denoting that the machine must be adjusted so as to produce a rod having a larger diameter. Thus, by the simple expedient of providing the expansion chambers 9 in immediate proximity of the testing passages 8, the nozzle 1 avoids the drawbacks of conventional monitoring apparatus wherein compressed testing fluid is permitted to act upon a relatively large area of the external surface of a porous or highly porous wrapping material. Distortion of the results of measurements as a consequence of penetration of testing fluid into the rod (rather than in the atmosphere, downstream of the actual testing location or locations (passages 8) would amount to a delayed distortion, i.e., a distortion attributable to circumstances which arise subsequent to the flow of testing fluid through the actual testing location or locations. Since the plenum chamber 3 is very narrow, since the passages 8 are also narrow (even narrower than the chamber 3), and the expansion chambers 9 are immediately adjacent to the passages 8, the improved nozzle 1 ensures that the impingement of pressurized testing fluid upon the exterior of the rod 2 is restricted to a very narrow region with attendant advantages, especially as regards the elimination of porosity of the material of the envelope 2c as a factor which could influence the intensity and/or other characteristics of signals at the terminals 26, 27 of the flow meter 14. The testing fluid which enters into and expands in the chambers 9 is permitted to flow into the atmosphere by way of the corresponding channels 12 and/or by way of the respective ports 11.

The regulating valve 19 is designed to maintain the pressure of testing fluid in the conduit 18 at a constant value, even at such times when the diameter of the envelope 2c varies, i.e., when the rate of flow of testing fluid through the unocccupied portions of the passages 8 is above or below the optimum value. Let it be assumed that the diameter of a portion of the envelope 2c, which is in the process of entering the nozzle 1, is on the decrease so that the area of the unoccupied portion of the cross-sectional area of each of the two passages 8 increases and such passages permit larger quantities of testing fluid to enter the respective expansion chambers 9. The resulting short-lasting drop of pressure in the plenum chamber 3 is detected by the transducer 23 which transmits a modified electric signal to the corresponding input of the regulating circuit 21. The circuit 21 can constitute a commercially available signal comparing stage wherein the signal from the transducer 23 is compared with the reference signal from the source 22. Such reference signal denotes the optimum pressure of testing fluid in the chamber 3. The circuit 21 then transmits a signal (denoting the difference between the signals from the transducer 23 and source 22) to the valVe 19 which allows the testing fluid to enter the conduit 18 at a higher rate with the result that the pressure in the plenum chamber 3 rises. Adjustment of the valve 19 is terminated when the intensity or another characteristic of the signal at the output of the transducer 23 again matches the corresponding characteristic of the reference signal which is transmitted by the source 22.

The flow meter 14 can be designed to monitor the rate Q of fluid flow in liters per minute and to generate a corresponding voltage signal V which can be transmitted to the filter rod making machine by way of the terminals 26, 27. The signal V is indicative of the diameter of the corresponding portion of the envelope 2c. For example, the signal V can be transmitted to the so-called format of a filter rod making machine, and more particularly to a motor which can change the position of an adjustable component in the format, namely a component whose adjustment influences the diameter of the rod 2. In this way, the diameter of the envelope 2c is changed with little delay so that such diameter again matches or closely approaches the desirable optimum value which is selected by appropriate setting of the source 22.

The valve 19 is selected or set in such a way that the pressure in the plenum chamber 3 of the nozzle 1 does not suffice to effect any appreciable deformation of the envelope 2c because such deformation would entail the escape of a higher percentage of testing fluid by way of the unoccupied portions of the passages 8. Such higher rate of outflow of testing fluid would be detected by the flow meter 14 which would generate a signal V denoting a diameter which is less than the actual diameter of the envelope 2c.

Figure 2:
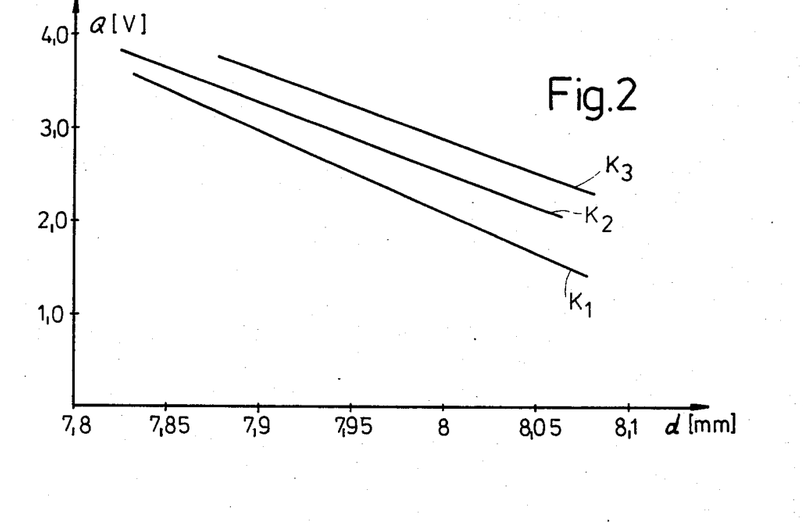
FIG. 2 is a diagram wherein the curves denote changes in the rate of flow of gaseous testing fluid to the nozzle of the testing apparatus of FIG. 1 in response to changes in the diameter of the rod for each of three different types of wrapping material.

FIG. 2 shows a diagram wherein the diameter d of the rod 2 is measured in millimeters along the abscissa and the rate Q of fluid flow through the meter 14 (i.e., the intensity of the signal V) is measured along the ordinate. The curves $K_1$, $K_2$ and $K_3$ are indicative of the porosities of three different wrapping materials which are converted into the envelopes 2c of rods 2. The porosity of the wrapping material which is denoted by the median curve $K_2$ is higher than that of the material which is denoted by the curve $K_1$ but lower than that of the material which is represented by the curve $K_3$. It will be noted that the rate Q of flow of testing fluid through the meter 14 will be influenced by the porosity of the wrapping material but not in a manner that would distort the results of measurements. In other words, when the porosity of the wrapping material is low (note the curve $K_1$), the rate Q of consumption of testing fluid will be lower irrespective of changes of the diameter of the envelope 2c which is made of such low-porosity wrapping material. FIG. 2 shows clearly that the apparatus can readily detect minute changes in the diameter d of the envelope 2c (such changes can be in the range of tenths or hundredths of one millimeter). Furthermore, FIG. 2 shows that the curves $K_1$, $K_2$ and $K_3$ are straight lines, i.e., that the relationship between the changes of diameter d and the rate Q of fluid flow through the flow meter 14 is linear. The advantages of such linear relationship between changes in the value of d and changes of Q (i.e., of V) will be readily appreciated. Thus, such relationship greatly simplifies the regulation of operation of the filter rod making machine for the purpose of restoring the diameter of the filter rod to the desired standard or optimum value.

It will be noted that the pressure of testing fluid which impinges upon the external surface of the envelope 2c in the plenum chamber 3 is at least substantially constant or is caused to reassume the preselected constant value as soon as the circuit 21 detects a departure from the constant value which is selected by the setting of the source 22 of reference signals. The basis for generation of signals V which denote the diameters d of successive increments of the tubular envelope 2c is the rate of flow of testing fluid through the passages 8, and such rate is detected by the flow meter 14 of the testing unit 15. As mentioned above, the pressure of testing fluid which impinges upon the envelope 2c is selected in such a way that it does not exceed a given value at which the testing fluid could deform the product 2 by flexing the wrapping material of the envelope 2c inwardly. The feature that the plenum chamber 3 is narrow (as considered in the axial direction of the rod 2 and nozzle 1) ensures that the apparatus can detect minute fluctuations of the diameter d and generate differentiated and largely undistorted signals, i.e., the apparatus prevents the generation of signals in response to fluctuations of porosity of the material of the envelope because such signals could distort the signals that denote the actual diameters of successive increments of the envelope. The reliability of testing operation is satisfactory when the porosity of the wrapping material is low or very low as well as when the porosity of such material is very pronounced. As also mentioned above, the width of the plenum chamber 3 need not exceed 5 mm and is preferably in the range of 1 mm. Such width (of approximately 1 mm) has been found to be highly satisfactory irrespective of actually occurring or anticipated fluctuations in the porosity of wrapping material. In other words, the selection of a plenum chamber 3 whose width is in the range of 1 mm is satisfactory for all wrapping materials which are contemplated for use in the making of filter rods and analogous rod-shaped products of the tobacco processing industry, as well as for all normally occurring fluctuations in permeability of such wrapping materials to a gaseous testing fluid.

Commonly owned U.S. Pat. No. 3,595,067, granted July 27, 1971 to Von Der Lohe et al. for "Method and apparatus for determining the firmness of fillers in cigarette rods or the like", discloses a nozzle which directs a stream of compressed gaseous testing fluid radially against the exterior of a moving cigarette rod. However, the purpose of testing (detection of firmness of the filler of the cigarette rod) is basically different and the testing fluid is admitted at a pressure such that the rod undergoes deformation as a result of impingement of testing fluid against its wrapper. The extent of deformation of the rod is monitored and the corresponding signals are indicative of the firmness of the filler.

The placing of passages 8 into immediate proximity of the plenum chamber 3 and the placing of expansion chambers 9 into immediate proximity of the respective passages 8 also enhances the accuracy and reliability of the testing operation. Thus, abrupt expansion of testing fluid in the chambers 9 (preferably to the extent such that the pressure of testing fluid drops to atmospheric pressure) reduces the likelihood of penetration of appreciable quantities of testing fluid through the wrapping material of the envelope 2c and into the filler 2d of the tested rod-shaped product 2. Such testing fluid would be detected by the flow meter 14 whose signal (V) would be distorted because it would be indicative of the rate of flow of testing fluid through the unoccupied portions of the passages 8 as well as of the rate of penetration of testing fluid into the filler 2d.

It has been found that the apparatus of FIG. 1 ensures the determination of diameters d of successive increments of the envelope 2c with a highly satisfactory degree of accuracy, at least while the porosity of the wrapping material is not excessive and/or while such porosity does not fluctuate within an extremely wide range.

The nozzle 1 can be shortened and simplified by eliminating those portions which define the guide channels 12, i.e., by shortening the nozzle in such a way that the expansion chambers 9 are in direct communication with the atmosphere or that the chambers 9 are also omitted and the testing fluid issuing from the passages 8 is free to immediately enter the surrounding atmosphere. The integration of guide means into the nozzle 1 is preferred at this time because such nozzle ensures more satisfactory guidance of the rod 2 along its path and also because the surfaces surrounding the channels 12 can intercept particles of glue and/or other impurities which, in the absence of the guide portions, would deposit on the knife edges 7 with attendant distortion of signals denoting the diameters of successive increments of the envelope 2c. If the nozzle 1 is shortened by omission of the channels 12 and ports 11, or by omission of the channels 12, ports 11 and expansion chambers 9, the apparatus of FIG. 1 can be provided with discrete guide means for the rod 2 upstream and/or downstream of the modified nozzle. The provision of ports 11 is desirable and advantageous because such ports enable at least the major percentage of testing fluid to leave the expansion chambers 9 and to enter the surrounding atmosphere by a route other than through the guide channels 12.

Figures 3, 4:
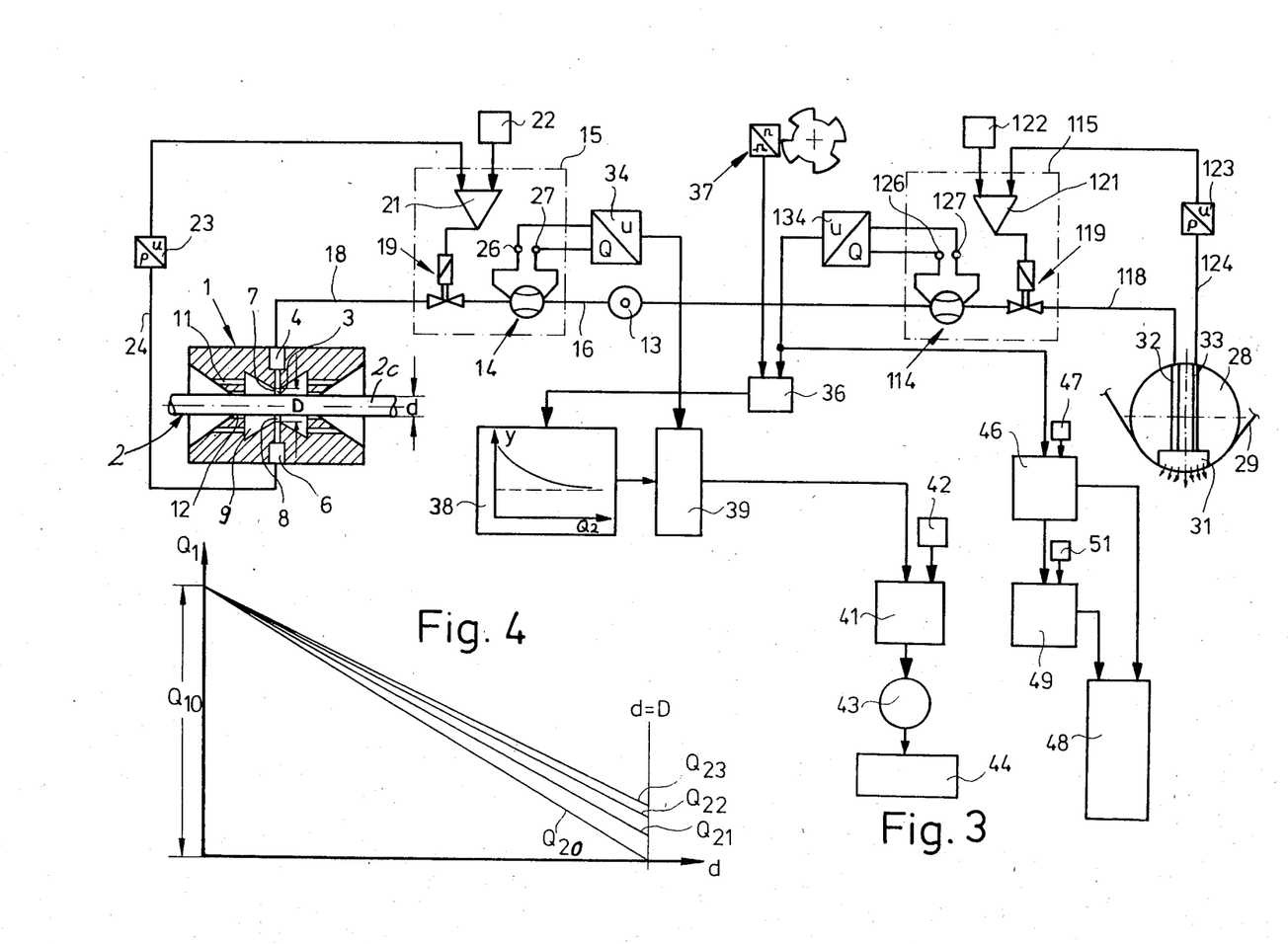
FIG. 3 is a schematic partly sectional view of a second apparatus which monitors the diameter of the rod as well as the porosity of wrapping material which is used for the envelope of the rod.
FIG. 4 is a diagram showing variations of the rate of admission of gaseous testing fluid to the nozzle of the testing apparatus of FIG. 3 in connection with the testing of rods having envelopes made of wrapping materials exhibiting different porosities.

The apparatus which is shown in FIG. 3 is used to monitor the diameter d of the rod 2 as well as to ascertain the porosity of the web 29 of wrapping material (shown on a greatly enlarged scale in the right-hand portion of FIG. 4) which is converted into the envelope 2c ahead of the location (nozzle 1) where the diameter d of the rod 2 is measured by an apparatus which is identical with that of FIG. 1 and whose constituents are denoted by the same reference characters. All such parts of the means for ascertaining the porosity of the web 29 of wrapping material which are identical with or clearly analogous to the corresponding parts of the apparatus for monitoring the diameter d of the rod 2 are denoted by similar reference characters plus 100.

The means for ascertaining the porosity of the web 29 of wrapping material comprises a cylindrical or tubular deflecting member 28 which, in a way, is analogous to the nozzle 1 and around which the web 29 of wrapping material is trained along an arc of at least but preferably in excess of 90 degrees. The web 29 can be transported to the rod forming station of a filter rod making machine, e.g., a machine of the type disclosed in commonly owned U.S. Pat. No. 4,046,064 granted Sept. 7, 1977 to Wahle for "Filter rod making machine" or in commonly owned U.S. Pat. No. 3,974,007 granted Aug. 10, 1976 to Greve for "Method and apparatus for the production of filter rod sections or the like". The disclosure of each patent mentioned herein is incorporated by reference.

The member 28 defines a testing chamber 31 which is radially inwardly adjacent to a perforated peripheral portion of the member 28 and allows compressed testing fluid to impinge upon successive increments of the running web 29. The chamber 31 receives pressurized testing fluid by way of a conduit 118 and a bore 32 which is machined into or otherwise formed in the member 28. Such testing fluid is supplied by the source 13 by way of a testing unit 115 which is analogous to the testing unit 15 of the means for monitoring the diameter d of the rod 2. A second bore 33 of the member 28 connects the chamber 31 with the inlet of a pressure-to-voltage transducer 123 which is installed in the conduit 124 and whose output is connected with the corresponding input of the regulating circuit (signal comparing stage) 121 in the testing unit 115. The other input of the circuit 121 is connected with a source 122 of reference signals and its output is connected with the regulating valve 119 between the conduit 118 and the flow meter 114.

Signals which are taken off the terminals 26, 27 of the flow meter 14 in the testing unit 15 of the means for monitoring the diameter d of the rod 2 are transmitted to the corresponding inputs of a flow rate-to-voltage transducer 34 of any known design, and the output of this transducer (such output transmits a voltage signal $Q_1$) is connected with the corresponding input of a computer 39. The signals (V) which are taken off the terminals 126, 127 of the flow meter 114 in the testing unit 115 are transmitted to the corresponding inputs of a second flow rate-to-voltage transducer 134 whose output transmits signals $Q_2$ and is connected with the corresponding input of a time-delay unit 36 (e.g., a shift register). The unit 36 is further connected with a timing pulse generator 37 which is designed to transmit pulses at a frequency corresponding to the speed of the filter rod making machine. The signals which are delayed by the unit 36 do not alter their amplitude. The purpose of the time delay unit 36 is to ensure that the signal which is transmitted by its output to the input of a function generator 38 reaches the second input of the computer 39 simultaneously with the signal $Q_1$ denoting the diameter of the corresponding portion of the tubular envelope 2c, i.e., that portion of the envelope which is made from the section of the web 29 that has caused the generation of the corresponding signal $Q_2$.

The function generator 38 modifies the incoming signals $Q_2$ in accordance with an empirically determined equation $Y=f(Q_2)$ The equation $Y=f(Q_2)$ is indicative of the slopes of all of the curves $Q_{20}$, $Q_{21}$, $Q_{22}$ and $Q_{23}$ which are shown in the diagram of FIG. 4 and wherein the diameter d of the rod 2 is measured along the abscissa and the value $Q_1$ (signal from the transducer 34) is measured along the ordinate. The curves $Q_{20}$ to $Q_{23}$ denote four of a full array of curves which are indicative of all theoretically obtainable diameters d of tested products for a variety of different webs 29, i.e., of webs having different porosities.

The curve $Q_{20}$ 20 of FIG. 4 is indicative of a web 29 whose porosity is zero, i.e., which is impermeable to air or another gaseous testing fluid. Thus, if the diameter d of a rod 2 containing an envelope 2c of such impermeable material were to equal the diameters D of the testing passages 8 in the nozzle 1, the rate of fluid flow from the chamber 3 would be zero because no fluid at all could penetrate through such envelope. The curves $Q_{21}$, $Q_{22}$ and $Q_{23}$ denote webs 29 of progressively higher porosity. Thus, if the rod 2 of FIG. 3 were to contain an envelope 2c made of a web with a porosity represented by the curve $Q_{21}$ and the diameter d of such rod were equal to the diameters D of the testing passages 8 in the nozzle 1 of FIG. 3, a certain amount of testing fluid would escape from the chamber 3 through the porous envelope 2c. The rate of outflow under identical circumstances would be higher if the envelope 2c were made of a web 29 which is represented by the curve $Q_{22}$ or $Q_{23}$ of FIG. 4.

FIG. 4 further shows that, as the diameter d of the rod 2 decreases, the influence of porosity of the selected web 29 upon the rate of outflow of testing fluid via passages 8 decreases, i.e., the distorting influence of the porosity of the web 29 upon the signal $Q_1$ decreases with decreasing diameter of the rod. In other words, the influence of the porosity of a highly porous web 29 is then at least substantially the same as that of the porosity of a less permeable web 29. Thus, at the zero point of the abscissa of the coordinate system of FIG. 4 (where d equals zero), the influence of the webs 29 exhibiting different porosities upon the measurement of the diameter of the rod is the same. Consequently, all of the curves $Q_{20}$ to $Q_{23}$ intersect each other at one and the same point of the ordinate. This means that, at such time, all of the testing fluid evidently escapes exclusively through the passages 8 and not through the envelope of the (non-existent) rod.

Signals which are transmitted by the output of the function generator 38 in accordance with the equation $Y=f(Q_2)$ can be used to ascertain whether or not the porosity of the selected web 29 is within the contemplated range, i.e., whether or not the attendant has inserted a proper reel or bobbin, namely a bobbin containing a supply of wrapping material (web 29) which is satisfactory for the making of acceptable filter rod sections. Such sections are obtained by severing the rod 2 at regular intervals by a suitable cutoff, not shown, in a manner well known from the art of filter rod making machines.

The computer 39 of FIG. 3 is designed to calculate the actual diameters of successive increments of the rod 2 on the basis of signals $Q_1$ which are supplied thereto by the transducer 34 and on the basis of signals which are supplied thereto by the function generator 38 in accordance with the aforediscussed equation $Y=f(Q_2)$. The calculation of d is made in accordance with the equation $$d=(Q_{10}-Q_1)/Y(Q_2)$$

wherein d is the diameter of the rod 2, $Q_{10}$ is the rate of fluid flow when the diameter d equals zero, $Q_1$ is the rate of fluid flow when the diameter d exceeds zero but at most equals D (i.e., the diameters of the testing passages 8), and $Y(Q_2)$ are values denoting the slopes of characteristic curves for the flow rate $Q_2$ in dependency upon the porosity of the selected wrapping material.

The computer 39 may be a commercially available module of the type AIM 65 which is manufactured and sold by Rockwell. A similar module can be used to perform the work of the function generator 38. Signals at the output of the computer 39 denote the detected diameter d of the rod 2, and such signals are transmitted to one input of a PID regulator 41 which further receives a reference signal from a suitable source 42. The signal which appears at the ouput of the PID regulator 41 when the signal denoting the detected diameter d deviates from the desired value (reference signal from 42) is transmitted to a servomotor 43 which can adjust a component 44 of the filter rod making machine, e.g., a member in a bonding chamber which can influence the diameter of the rod 2 in a manner well known from the art of filter rod making machines. A suitable filter rod making machine is MAX or MAX S produced by the assignee of the present application. Reference may be had, for example, to commonly owned U.S. Pat. No. 4,037,608 granted July 26, 1977 to Wahle for "Method and apparatus for producing cigarettes with dense ends". The motor 43 is reversible so that it can cause the component 44 to increase or reduce the diameter of the rod 2, depending on the (positive or negative) characteristics of the signal which is transmitted by the computer 39.

The signals $Q_2$ which are generated by the transducer 134 are transmitted, without any delay, to a threshold circuit 46 which is further connected with a source 47 of reference signals $Q_{MIN}$ denoting the still acceptable lowest-intensity signal $Q_2$. If the intensity of signals $Q_2$ which is generated by the transducer 134 is less than that denoted by the signal $Q_{MIN}$, the output of the threshold circuit 46 transmits a signal to an alarm device 48 which generates a visible and/or otherwise detectable signal to warn the attendants that the porosity of the web 29 is unsatisfactory. The alarm device 48 can be designed to transmit or generate the aforementioned detectable signals and/or to automatically arrest the main prime mover of the filter rod making machine.

The output of the transducer 134 is further connected with one input of a second threshold circuit 49 (e.g., by way of a second output of the threshold circuit 46). Another input of the threshold circuit 49 is connected with a source 51 of reference signals, namely a source which transmits a signal $Q_{MAX}$ denoting the maximum acceptable permeability of the web 29. The output of the second threshold circuit 49 is also connected with the alarm device 48 to actuate the latter whenever the porosity of the web 29 is so high that the web cannot be used for the making of a satisfactory rod 2.

The testing unit 115 of FIG. 3 can be omitted if the porosity of the web 29 is to be ascertained only once, e.g., immediately after a fresh bobbin or reel containing a supply of convoluted wrapping material is inserted into the filter tipping machine. The testing unit 15 is then connected to the deflecting member 28 and transducer 134 for a short interval of time to rapidly ascertain the porosity of the freshly inserted web 29 (it being then assumed that the porosity of the entire web is the same), and the unit 15 is thereupon again connected with the nozzle 1 to enable the apparatus to continuously monitor the diameter d of the rod 2 which includes an envelope 2c made of the freshly inserted web 29. An advantage of such modified apparatus is its lower cost because one of the testing units 15, 115 can be dispensed with. Moreover, and if the porosity of a web 29 is normally or practically invariably constant from end to end, omission of one of the testing units 15, 115 does not adversely affect the accuracy of the thus modified apparatus. Ascertainment of the porosity of the web which is stored on a freshly inserted bobbin immediately subsequent to mounting of the bobbin in the machine is desirable and advantageous for obvious reasons, i.e., one can detect a defective or unsatisfactory bobbin before the machine turns out a substantial number of defective rod-shaped articles.

The apparatus of FIG. 3 exhibits the advantage that it can furnish signals which accurately reflect the diameters d of successive increments of the filter rod 2, even if the porosity of the web 29 of wrapping material fluctuates within an extremely wide range, e.g., when the departure of actual porosity of the web 29 from anticipated porosity is attributable to an error, such as the placing of an improper bobbin or reel into the filter rod making machine. Moreover, the apparatus of FIG. 3 is capable of furnishing signals which are indicative of the diameters of successive increments of the product 2 with an even higher degree of accuracy than the apparatus of FIG. 1, even if the porosity of the web 29 is acceptable and even if such porosity fluctuates within an anticipated range, because the apparatus of FIG. 3 includes means (the function generator 38 and the computer 39) for relating the first signals ($Q_1$) and the second signals ($Q_2$) to each other in such a way that the resulting signals (to the PID regulator 41) are even more accurately indicative of the diameters d than the signals at the terminals 26, 27 of the flow meter 14.

The deflecting member 28 of FIG. 3 can be placed adjacent to the path of movement of the web 29 toward that station of the filter rod making machine where the web is draped around the rod-like filler of fibrous material to form therewith a continuous filter rod 2. In ascertaining the porosity of the web 29, the pressure of pneumatic testing fluid in the plenum chamber 31 is maintained (by the means 119 to 123) at a constant value such as is selected by the setting of the source 122 of reference signals. The basis for ascertainment of porosity is the rate of flow of pneumatic testing fluid through the web 29 adjacent to the plenum chamber 31, and such rate is monitored by the flow meter 114.

The provision of threshold circuits 46, 49 and alarm device 48 is optional but highly desirable and advantageous. For example, the device 48 will generate an alarm signal when the operator has inserted an unsatisfactory bobbin so that the filter rod making machine would be likely to turn out many thousands of unsatisfactory filter rod sections of unit length or multiple unit length.

As a rule, the fluctuations of porosity of highly porous wrapping material are much more pronounced than those of low-porosity material. The apparatus of FIG. 3 can ascertain such porosity with a heretofore unmatched degree of accuracy, and the results of such ascertainment are then related to the result of the measurement of diameter d in a manner as described in connection with FIG. 3 to obtain extremely accurate indications of the diameters of successive increments of the rod 2. In fact, that portion of the apparatus which is shown in the right-hand part of FIG. 3 and is used to ascertain the porosity of the web 29 can be used in conjunction with the apparatus of FIG. 1 (as actually shown in FIG. 3) or in conjunction with a conventional apparatus for determining the diameter of a moving rod of wrapped filter material or wrapped tobacco.

An important advantage of the improved method and apparatus is that one can obtain signals whose characteristics vary linearly as a function of deviations of the diameters d of successive increments of the rod-shaped product from a predetermined optimum value. As mentioned above, this is especially desirable for the purposes of effecting accurate, simple and predictable regulation of operation of the machine which turns out the product so that the deviations of monitored diameters from the desired value are eliminated with little loss in time and by resorting to simple instrumentalities. Moreover, the improved method and apparatus render it possible to ascertain minute deviations of the diameters of successive increments of the monitored product from the desired value so that the machine which is combined with or embodies such apparatus can turn out rod-shaped products which constitute or can be assembled into high-quality smokers' articles. This is due to the fact that the apparatus which is used to monitor the diameters d is designed with a view to eliminate the influence of porosity and/or fluctuations of porosity upon the diameter monitoring operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of monitoring the diameter of a rod-shaped product of the tobacco processing industry which is deformable by the impinging gaseous fluid when the pressure of such fluid exceeds a given value, particularly a filter rod having a porous tubular wrapper; comprising the steps of transporting the product axially along a predetermined path; establishing between the exterior of the product in a portion of said path and the atmosphere at least one passage of predetermined cross-sectional area so that the unoccupied portion of such passage varies with deviations of the diameter of the product portion in the passage from a predetermined value; directing against the exterior of the moving product a stream of gaseous testing fluid so that the fluid impinges upon the product; confining such fluid to the flow into the atmosphere at least substantially exclusively by way of the unoccupied portion of the passage; maintaining the pressure of the impinging fluid at an at least substantially constant value which at most matches said given value so that the impinging fluid does not effect any deformation of the product in said path; and generating first signals denoting fluctuations of the rate of fluid flow through said passage as a function of deviations of the diameter of the product from said predetermined value.

2. The method of claim 1, wherein said directing step includes directing an annular stream of testing fluid against a circumferentially complete narrow annular portion of the exterior of the product in said path.

3. The method of claim 1, wherein the pressure of impinging testing fluid exceeds atmospheric pressure and further comprising the step of effecting an abrupt drop of pressure of testing fluid immediately downstream of said passage.

4. The method of claim 3, wherein said effecting step includes reducing the pressure of testing fluid to atmospheric pressure.

5. The method of claim 1 of monitoring the diameter of a rod-shaped product of the type having a tubular envelope consisting of porous wrapping material, further comprising the steps converting the wrapping material into said envelope ahead of said portion of said path, ascertaining the porbsity of wrapping material prior to said converting step, generating second signals denoting the ascertained porosity, and relating the second signals to the respective first signals.

6. The method of claim 5 wherein said ascertaining step includes directing against the wrapping material a pneumatic testing fluid whereby the pneumatic fluid penetrates through the wrapping material at a rate which is a function of porosity of the wrapping material, said step of generating second signals including generating signals whose characteristics fluctuate as a function of fluctuations of the rate of flow of pneumatic fluid through the wrapping material.

7. The method of claim 6, further comprising the step of maintaining the pressure of the pneumatic fluid at an at least substantially constant value.

8. The method of claim 5, further comprising the step of delaying each of said second signals prior to said relating step.

9. The method of claim 8, wherein each of said second signals has a predetermined amplitude and said delaying step is carried out without influencing the amplitude of delayed second signals.

10. The method of claim 5, further comprising the steps of comparing said second signals with a signal denoting a minimum acceptable porosity and generating a third signal whenever the porosity which is denoted by a second signal is below said minimum acceptable porosity.

11. The method of claim 5, further comprising the steps of comparing said second signals with a signal denoting a maximum acceptable porosity and generating a third signal whenever the porosity which is denoted by a second signal exceeds said maximum acceptable porosity.

12. Apparatus for monitoring the diameter of a rod-shaped product of the tobacco processing industry which is deformable by the impinging testing fluid when the pressure of such fluid exceeds a given value, particularly of filter rod having a porous tubular wrapper, comprising means for transporting the product axially along a predetermined path; means for establishing between the exterior of the product in a predetermined portion of said path and the atmosphere at least one passage of predetermined cross-sectional area so that the unoccupied portion of such passage varies with deviations of the diameter of the product portion in the passage from a predetermined value; a source of compressed gaseous testing fluid; means for conveying from said source a stream of testing fluid against the exterior of the product so that the fluid impinges upon the product, including means for confining the fluid to the flow into the atmosphere by way of the unoccupied portion of said passage; means for maintaining the pressure of conveyed fluid at an at least substantially constant value, including means for holding the pressure of testing fluid at or below said given value so that the testing fluid does not effect any deformation of the product in said path; and means for generating first signals denoting fluctuations of the rate of flow of testing fluid through said passage as a function of deviations of the diameter of the product from said predetermined value.

13. The apparatus of claim 12, wherein said confining means includes an annular plenum chamber which surrounds a second portion of said path adjacent to said predetermined portion.

14. The apparatus of claim 12, wherein said establishing means includes an annular member having a circumferentially complete knife edge surrounding said passage.

15. The apparatus of claim 12, further comprising a nozzle including said establishing and said confining means, said confining means including an annular plenum chamber which is adjacent to a second portion of said path upstream of said predetermined portion and said nozzle having an expansion chamber disposed immediately downstream of and communicating with said passage to effect an abrupt reduction of pressure of testing fluid which flows from said passage toward the atmosphere.

16. The apparatus of claim 15, wherein said nozzle further comprises guide means for the product, said guide means surrounding at least one additional portion of said path.

17. The apparatus of claim 15, wherein said nozzle has at least one port connecting said expansion chamber with the atmosphere.

18. The apparatus of claim 15, wherein said nozzle further comprises guide means for the product, said guide means having a channel whose cross-sectional area is smaller that the cross-sectional area of said passage.

19. The apparatus of claim 12 for monitoring the diameter of a rod-shaped product having a tubular wrapper consisting of porous wrapping material, further comprising means for ascertaining the porosity of the wrapping material, means for generating second signals denoting the porosity of the wrapping material, and means for relating said second signals to said first signals.

20. The apparatus of claim 19, wherein said ascertaining means includes a source of compressed pneumatic testing fluid and means for directing a stream of pneumatic fluid from the respective source against the wrapping material so that the rate of flow of pneumatic fluid through the wrapping material is indicative of the porosity of such material, said means for generating second signals including means for monitoring the rate of flow of pneumatic fluid through the wrapping material.

21. The apparatus of claim 20, further comprising means for maintaining the pressure of pneumatic fluid which is directed against the wrapping material at an at least substantially constant value.

22. The apparatus of claim 19, wherein said relating means includes computer means arranged to receive first and second signals from the respective signal generating means.

23. The apparatus of claim 19, wherein said relating means includes a function generator arranged to modify said second signals in dependency upon the anticipated porosity of the wrapping material.

24. The apparatus of claim 19, further comprising means for comparing said second signals with a reference signal denoting the minimum acceptable porosity of wrapping material and for generating third signals when the porosity of wrapping material which is denoted by a second signal is less than said minimum acceptable porosity.

25. The apparatus of claim 19, further comprising means for comparing said second signals with a reference signal denoting the maximum aceptable porosity of wrapping material and for generating third signals when the porosity denoted by a second signal exceeds such maximum acceptable porosity.

26. The apparatus of claim 19, further comprising means for delaying the transmission of second signals to said relating means.

27. The apparatus of claim 26, wherein the wrapping material constitutes a running web and said ascertaining means includes means for ascertaining the porosity of successive increments of the running web, said delaying means including means for delaying the transmission of second signals to said relating means for intervals of time such that the relating means receives a first signal simultaneously with a second signal denoting the porosity of that portion of the wrapper which is then located in said predetermined portion of said path.

28. A method of monitoring the diameter of a rod-shaped product of the tobacco processing industry of the type having a tubular envelope consisting of porous wrapping material, particularly a filter rod having a porous tubular wrapper, comprising the steps of transporting the product axially along a predetermined path; establishing between the exterior of the product in a portion of said path and the atmosphere at least one passage of predetermined cross-sectional area so that the unoccupied portion of such passage varies with deviations of the diameter of the product portion in the passage from a predetermined value; directing against the exterior of the moving product a stream of gaseous testing fluid so that the fluid impinges upon the product; confining such fluid to the flow into the atmosphere at least substantially exclusively by way of the unoccupied portion of the passage; maintaining the pressure of the impinging fluid at an at least substantially constant value; generating first signals denoting fluctuations of the rate of fluid flow through said passagee as a function of deviations of the diameter of the product from said predetermined value; converting the wrapping material into said envelope ahead of said portion of said path; ascertaining the porosity of wrapping materail prior to said converting step; generating second signals denoting the ascertained porosity; and relating the second signals to the respective first signals, including modifying the second signals in accordance with the equation $$d = (Q_{10} - Q_1)/Y(Q_2)$$

wherein d is the diameter of the product, $Q_{10}$ is the rate of fluid flow through said passage when the diameter of the product equals zero, $Q_1$ is the rate of fluid flow through the passage when the diameter of the product exceeds zero but does not exceed the diameter of the passage, and $Y(Q_2)$ denotes the porosity of the selected wrapping material.

* * * * *